United States Patent
Fukushi et al.

(10) Patent No.: US 7,138,470 B2
(45) Date of Patent: Nov. 21, 2006

(54) FLUOROELASTOMERS WITH IMPROVED LOW TEMPERATURE PROPERTY AND METHOD FOR MAKING THE SAME

(75) Inventors: Tatsuo Fukushi, Woodbury, MN (US); Nena M. Serios, Hudson, WI (US); Steven J. Wellner, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/759,497

(22) Filed: Jan. 16, 2004

(65) Prior Publication Data

US 2005/0159557 A1    Jul. 21, 2005

(51) Int. Cl.
*C08F 114/18*    (2006.01)

(52) U.S. Cl. .................. 526/255; 526/254; 526/247; 525/326.3

(58) Field of Classification Search ............ 526/255, 526/254, 247; 525/326.3
See application file for complete search history.

(56) References Cited

U.S. PATENT DOCUMENTS

| | | | |
|---|---|---|---|
| 3,470,176 A | 9/1969 | Zollinger | 544/193 |
| 3,523,118 A | 8/1970 | Emerson et al. | 544/216 |
| 3,546,186 A | 12/1970 | Gladding et al. | 526/245 |
| 4,123,603 A | 10/1978 | Stewart, Jr. | 526/254 |
| 4,214,060 A | 7/1980 | Apotheker et al. | |
| 4,243,770 A | 1/1981 | Tatemoto et al. | 525/340 |
| 4,361,678 A | 11/1982 | Tatemoto et al. | 528/374 |
| 4,935,467 A | 6/1990 | Cheng et al. | |
| 5,006,594 A | 4/1991 | Rees | |
| 5,175,223 A * | 12/1992 | Brinati et al. | 526/254 |
| 5,214,106 A | 5/1993 | Carlson et al. | 525/263 |
| 5,225,504 A | 7/1993 | Tatsu et al. | 526/206 |
| 5,384,374 A * | 1/1995 | Guerra et al. | 525/326.4 |
| 5,427,831 A | 6/1995 | Stevens | |
| 6,191,208 B1 * | 2/2001 | Takahashi | 524/494 |
| 6,310,141 B1 | 10/2001 | Chen et al. | |
| 6,410,630 B1 | 6/2002 | Hoover et al. | 524/365 |
| 6,506,460 B1 * | 1/2003 | Paglia et al. | 427/517 |
| 6,706,819 B1 * | 3/2004 | Araki et al. | 525/199 |

FOREIGN PATENT DOCUMENTS

| | | | |
|---|---|---|---|
| EP | 445839 A1 * | 9/1991 | |
| JP | 60-221409 | 11/1985 | |

* cited by examiner

*Primary Examiner*—David W. Wu
*Assistant Examiner*—Henry S. Hu

(57) ABSTRACT

A compound is prepared, suitable for forming fluoroelastomers, having the unique features of a low glass transition temperature and desirable physical properties. The compound generally comprises an elastomeric copolymer, a curable component, and at least one mineral filler. The elastomeric copolymer includes interpolymerized monomeric units derived from vinylidene fluoride. Upon vulcanization the resulting elastomeric compound has desirable physical characteristics as indicated by the tensile strength, elongation and the retraction at lower temperatures (TR-10).

18 Claims, No Drawings

FLUOROELASTOMERS WITH IMPROVED LOW TEMPERATURE PROPERTY AND METHOD FOR MAKING THE SAME

FIELD OF THE INVENTION

The present invention relates to a compound suitable for forming a fluoroelastomer having improved low temperature property. The present invention also includes a process for producing the fluoroelastomer.

BACKGROUND OF THE INVENTION

Increasingly stringent evaporative fuel standards for automobiles and trucks demand that the fuel system component minimize the emission of fuel vapors through automotive components such as the fuel tank, fuel filler lines, fuel injector seals, and fuel seals. Fluoroelastomers such as copolymer of vinylidene fluoride (VDF) and hexafluoropropylene (HFP), and terpolymers of tetrafluoroethylene (TFE), vinylidene fluoride (VDF) and hexafluoropropylene (HFP) have been used for reducing fuel permeation from the above-noted fuel seal applications. However, fluoroelastomers employed in fuel seal applications generally require low temperature properties to maintain sealing performance for cold weather.

Various types of fluoroelastomers for fuel seals have been proposed to address these concerns. In general, the most successful of the elastomers generally contain perfluoromethylvinylether (PMVE). PMVE effectively reduces the glass transition temperature of the resulting polymer. However, perfluoroalkylvinylether monomers are expensive and as such the resulting fluoroelastomers are relatively high priced.

SUMMARY OF THE INVENTION

The present invention is directed to a compound suitable for forming fluoroelastomers having the unique features of a low temperature property and desirable physical properties. The compound includes an elastomeric copolymer having interpolymerized units derived from vinylidene fluoride (VDF), at least one cure site moiety, and substantially no perfluorinated vinyl ether monomers.

The compound also includes a curable component and at least one mineral filler. Preferably, the mineral filler is present in at least 10 parts by weight per 100 parts of the elastomeric copolymer. Upon vulcanization the resulting compound has desirable physical characteristics as indicated by the tensile strength, the elongation, and the temperature to 10% retraction at lower temperature (TR 10).

With respect to the tensile strength the present invention generally exhibits a tensile strength according to ASTM D418-02 of 3.5 MPa or greater.

The temperature to 10% retraction (TR 10) at lower temperatures according to ASTM D 1329-02 is −20° C. or less and preferably −22° C. or less.

The compound of the present invention may be vulcanized using conventional methods. Further, the articles produced using the present compound are suitable for various sealing applications, including applications in the automotive industry.

DETAILED DESCRIPTION

The present invention is directed to a polymeric compound that is suitable for use, upon vulcanization, as a fluoroelastomer for sealing applications. The polymeric compound is generally multicomponent system comprising an elastomeric copolymer that includes vinylidene fluoride (VDF). The compound also contains a curable component and at least one mineral filler. The compound may include one or more conventional adjuvants, such as, for example, acid acceptors, process aids, or colorants. The mineral fillers of the present invention assist in achieving the desired temperature retraction point at lower temperature and are directed to maintaining the physical properties of the resulting vulcanized article. For purposes of the present invention, an elastomeric copolymer is one that exhibits an elongation of the resulting vulcanized article according to ASTM D418-02 of 100% or greater.

The copolymer of the present invention includes interpolymerized units of at least vinylidene fluoride and substantially no perfluorinated vinyl ether monomers, and interpolymerized units of another conventional monomer. By "substantially no perfluorinated vinyl ether monomers," it is meant that the fluoropolymer comprises less than 5 mole % of interpolymerized units derived from perfluorinated vinyl ether monomers, more preferably less than about 3 or 2 mole % interpolymerized units derived from perfluorinated vinyl ether monomers, and most preferably no interpolymerized units derived from perfluorinated vinyl ether monomers. For example, the perfluorinated vinyl ether monomers include perfluoromethylvinylether (PMVE), perfluoropropylvinylether (PPVE).

For purposes of the present invention, the term copolymer is intended to include a polymer derived from two or more monomeric units. In preferred embodiments, the present invention may include specific copolymer, terpolymers or quadpolymers that are employed to achieve specific physical characteristics in the final vulcanized compound.

Non-limiting examples of suitable monomers include compositions selected from tetrafluoroethylene, hexafluoropropylene, chlorotrifluoroethylene, pentafluoropropylene, vinyl fluoride, propylene, and ethylene. Combinations of the noted monomers may also be employed in the first component of the present invention. The first component may also inlcude ethylenically unsaturated monomers of the formula $CF_2=CFR_f$ where $R_f$ is fluorine or perfluoroalkyl of 1 to 8 carbon atoms.

Those skilled in the art are capable of selecting specific monomers at appropriate amounts to form an elastomeric polymer. Thus, the appropriate level of monomers based on mole %, are selected to achieve an elastomeric, polymeric composition.

Preferably, the fluorocarbon polymers of the present invention include about 50–80 mole % of the repeating units derived from vinylidene fluoride (VDF), and about 10–50 mole % of the repeating units derived from the perfluorinated ethylenically unsaturated monomers of the formula $CF_2=CFR_f$ where $R_f$ is fluorine or perfluoroalkyl of 1 to 8 carbon atoms. The fluorocarbon polymers can optionally include up to about 40 mole % of repeating units derived from a fluoromonoolefin other than the vinylidene fluoride (VDF). Such other fluoromonoolefins include, for example, tetrafluoroethylene (TFE), hexafluoropropene (HFP), chlorotrifluoroethylene (CTFE), 1-hydropentafluoropropene, perflourocyclobutene, and perfluoro(methylcyclopropene). Optionally, the aforementioned one or more fluoromonoolefins may be copolymerized with fluorine-free olefinic monomers such as ethylene and propylene.

In an alternative preferred embodiment, the fluorocarbon polymers of the present invention include about 45–85 mole % of the repeating units derived from vinylidene fluoride (VDF), and about 0–32 mole % of the repeating units derived from the tetrafluoroethylene (TFE), and about 5–25 mole % of the repeating units derived from the hexafluoropropylene (HFP), with a cure site moiety. The fluorocarbon polymers can optionally include up to about 25 mole % of repeating units derived from a fluoroolefin other than the vinylidene fluoride. Such other fluoromonoolefins include, for example, chlorotrifluoroethylene (CTFE), hydropentafluoropropene, perflourocyclobutene, and perfluoro(methylcyclopropene). Optionally, the aforementioned one or more fluoromonoolefins may be copolymerized with fluorine-free olefinic monomers such as ethylene and propylene. Also the present invention may include specific blends of copolymers, terpolymers or quadpolymers that are employed to achieve specific physical characteristics or chemical resistance, e.g. solvent swell, in the final vulcanized compound. Preferably, at least two copolymers combined to form blends have a difference in fluorine content of at least 3 weight %. Non-limiting examples of blends containing a high fluorine terpolymer gum and low fluorine terpolymer gum include: TFE/HFP/VDF/cure site monomer (CSM)=9.9/14.3/75.3/0.5 mole %; TFE/HFP/VDF/CSM=13.1/17.5/68.9/0.5 mole %; TFE/HFP/VDF/CSM=15.6/17.7/66.2/0.5 mole %; HFP/VDF/CSM=22/77.5/0.5 mole %; and TFE/HFP/VDF/CSM=30.1/20.7/48.7/0.5 mole %.

A component of the elastomeric copolymer may generally include an effective amount of cure site moieties derived from one or more compounds of the formula: a) $CX_2$=CX(Z), wherein: (i) X each is independently H or F; and (ii) Z is Br, I, Cl or $R_f 2$ U wherein U=Br, I, Cl, or CN and $R_f 2$=a perfluorinated divalent linking group optionally containing O atoms; or (b) $Y(CF_2)_q Y$, wherein: (i) Y is Br or I or Cl and (ii) q=1–6. Preferably the cure site moieties are derived from one or more compounds selected from the group consisting of $CF_2$=CFBr, $CF_2$=CHBr, $ICF_2 CF_2 CF_2CF_2$ I, $CH_2I_2$, $BrCF_2CF_2Br$, $CF_2$=$CFO(CF_2)_3$—$OCF_2CF_2Br$, $CF_2$=$CFOCF_2CF_2Br$, $CH_2$=$CHCF_2CF_2Br$ (BTFB), $CH_2$=$CHCF_2CF_2I$, $CF_2$=CFCl and mixtures thereof. In a most preferred embodiment, the iodine, bromine, or chlorine are chemically bound to chain ends of the first component of the compound. Optionally, nitrile cure site moieties may also be utilized. The crosslinkable composition can further include one or more substances known to promote the formation of triazine rings by trimerization of nitriles under the influence of heat. These include organometallic compounds of arsenic, antimony, and tin described in U.S. Pat. Nos. 3,470,176, 3,546,186, and the metal oxides described in U.S. Pat. No. 3,523,118, all herein incorporated by reference in their entirety.

The compound also includes a curable component that enables vulcanization of the fluoropolymer. The curable component may include curable materials, such as, for example, peroxide and one or more co-agents. Peroxide curatives include organic or inorganic peroxides. Organic peroxides are preferred, particularly those that do not decompose during dynamic mixing temperatures. Examples of non-limiting peroxides include dicumyl peroxide, 2,5-dimethyl-2,5-di(t-butylperoxy)hexane, di-t-butyl peroxide, t-butylperoxy benzoate, 2,5-dimethyl-2,5-di(t-butylperoxy) hexane-3 and laurel peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of fluoropolymer. Other conventional radical initiators are sutiable for use with the present invention.

In peroxide vulcanization of the fluorocarbon polymer using an organic peroxide, it is often desirable to include a co-agent. Those skilled in the art are capable of selecting conventional co-agents based on desired physical properties. Non-limiting examples of such agents include tri(methyl) allyl isocyanurate (TMAIC), triallyl isocyanurate (TAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. Another useful co-agent may be represented by the formula $CH_2$=CH—$R_f^1$—CH=$CH_2$ wherein $R_f^1$ may be a perfluoroalkylene of 1 to 8 carbon atoms. Such co-agents provide enhanced mechanical strength to the final cured elastomer. They generally are used in amount of 1 to 10 parts by weight, or preferably 1 to 5 parts by weight, per 100 parts of the fluorocarbon polymer.

Mineral fillers are employed in the present invention to achieve the desired physical characteristics of the resulting vulcanized polymer. For purposes of the invention, mineral fillers may be natural or synthetic and generally include oxides, fluorides, carbonates and sulfates of metals of Groups 2, 4, 8, 12, 13 and 14 in the periodic table, or combination thereof. Specifically excluded from this group are carbon black fillers. The mineral fillers are preferably included at about at least 10 parts by weight per 100 parts of the first component of the compound. Non-limiting examples of mineral fillers include clay, silica ($SiO_2$), talc, diatomaceous earth, barium sulfate, wollastonite ($CaSiO_3$), calcium carbonate ($CaCO_3$), calcium fluoride, titanium oxide, and iron oxide other than carbon black fillers. Surface-treated or coated mineral fillers using silane coupling agents, titanate coupling agents, or stearic acid may be employed. Combinations of conventional mineral fillers may also be employed. Those skilled in the art are capable of selecting specific fillers at required amounts to achieve desired physical characteristics in the vulcanized compound. The mineral filler components result in a compound that is capable of retaining a preferred elasticity and physical tensile, as indicated by a elongation and tensile strength value, while retaining a desired retraction at lower temperature (TR-10) when compared with carbon black fillers.

Conventional adjuvants may also be incorporated into the compound of the present invention to enhance the properties of the compound. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from about 1 to about 20 parts per 100 parts by weight of the polymer.

The polymers of this invention may be prepared using free radical batch or semi-batch, or continuous free radical emulsion polymerization processes. They may also be prepared by free radical suspension polymerization processes.

For example, if a continuous emulsion process is utilized, the polymers are generally prepared in a continuous stirred tank reactor. Polymerization temperatures may be in the range of 40° to 145° C., preferably 100° to 135° C. at pressures of 2 to 8 MPa. Residence times of 20 to 60 minutes are preferred. Free radical generation may be affected through use of a water-soluble initiator such as ammonium persulfate, either by thermal decomposition or by reaction with a reducing agent such as sodium sulfite. An inert surface-active agent such as ammonium perfluorooctanoate may be utilized to stabilize the dispersion, usually in conjunction with addition of a base such as sodium hydroxide or a buffer such as disodium phosphate to control pH in the range 3 to 7. Unreacted monomer is removed from the reactor effluent latex by vaporization at reduced pressure. Polymer is recovered from the stripped latex by coagulation.

For example, coagulation may be affected by reducing latex pH to about 3 by addition of acid, then adding a salt solution, such as an aqueous solution of calcium nitrate, magnesium sulfate, or potassium aluminum sulfate, to the acidified latex. The polymer is separated from the serum, then washed with water and subsequently dried. After drying, the product may be cured.

Chain transfer agents may be used in the polymerization in order to control the molecular weight distribution of the resulting polymers. Examples of chain transfer agents include isopropanol; methyl ethyl ketone; ethyl acetate; diethyl malonate; isopentane; 1,3-diiodoperfluoropropane; 1,4-diiodoperfluorobutane; 1,6-diiodoperfluorohexane; 1,8-diiodoperfluorooctane; methylene iodide; trifluoromethyl iodide; perfluoro(isopropyl) iodide; and perfluoro(n-heptyl) iodide. Polymerization in the presence of iodine-containing chain transfer agents may result in a polymer with one or two iodine atoms per fluoroelastomer polymer chain, bound at the chain ends (see for example U.S. Pat. No. 4,243,770 and U.S. Pat. No. 4,361,678, herein incorporated by reference in their entirety). Such polymers may have improved flow and processability compared to polymers made in the absence of a chain transfer agent. Generally, up to about 1 mole percent iodine chemically bound to fluoroelastomer chain ends will be incorporated into the polymer, preferably from 0.1–0.3 mole %.

The crosslinkable fluoropolymer composition can be compounded with the curable component or mixed in one or several steps, using any of the usual rubber mixing devices such as internal mixers (e.g., Banbury mixers), roll mills, etc. For best results, the temperature of the mixture should not rise above about 120° C. During mixing it is necessary to distribute the components and additives uniformly throughout for effective cure.

The mixture is then processed and shaped, for example, by extrusion (for example in the shape of a hose or hose lining) or molding (for example, in the form of an O-ring seal). The shaped article can then be heated to cure the gum composition and form a cured elastomer article.

Pressing of the compounded mixture (i.e., press cure) is typically conducted at a temperature of about 120–220° C., preferably about 140–200° C., for a period of about 1 minute to about 15 hours, usually for about 1–15 minutes. A pressure of about 700–20,000 kPa, preferably about 3400–6800 kPa, is typically used in molding the composition. The molds first may be coated with a release agent and prebaked.

The molded vulcanizate can be post cured in an oven at a temperature of about 140–240° C., preferably at a temperature of about 160–230° C., for a period of about 1–24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hours or more.

The cured compound of the present invention exhibits a combination of beneficial physical characteristics relating to tensile strength and retraction at lower temperature (TR-10) when compared to conventional compounds. The compound exhibits a tensile strength value, as indicated by the tensile strength test (ASTM D418-02) of about 3.5 MPa of greater. The compound may also exhibit an elongation at break value, as indicated by the elongation test (ASTM D418-02) of about 100% or greater.

The tensile strength and elongation values are an indication of the physical strength, elasticity and viscoelastic behavior of the material. The compound also has a TR-10 of about −20° C. or less, and preferably −22° C. or less.

The resulting compound exhibits a solvent volume swell in Fuel H (CE15) for 22 hours at 70° C. of about 60% or less, according to ASTM D471-98. The combination of the noted physical characteristics make the curable compounds well suited for sealing applications that require low temperature performance.

The invention is further illustrated in the following examples.

EXAMPLES

In the following Examples and Comparative Examples, samples were prepared and properties of the samples were evaluated. All concentrations and percentages are by weight unless otherwise indicated. The fluoroelastomer compounds, which are used in the Examples and Comparative Examples, also are summarized in Table 1. All amounts are expressed in parts by weight, or parts by weight per one hundred parts by weight of rubber (phr). As represented in the Examples and Tables, VDF is vinylidene fluoride, TFE is tetrafluoroethylene, HFP is hexafluoropropylene, PMVE is perfluoromethylvinylether and BTFB is 4-bromo-3,3,4,4-tetrafluorobutene.

Test Methods

Mooney viscosity was determined by ASTM 1646-00 (ML 1+10@ 121° C.). Results are reported in Mooney units.

Cure rheology Tests were run on uncured, compounded admixtures using an Alpha Technology Moving Die Rheometer (MDR) Model 2000 in accordance with ASTM D 5289-95 at 177° C., no preheat, 12 minute elapsed time (unless otherwise specified) and a 0.5° C. arc. Minimum torque (ML), Maximum torque (MH), i.e., highest torque attained during specified period of time when no plateau or maximum was obtained and Difference in Torque, ΔT, i.e., (MH−ML), were reported. Also reported were: ts 2 (time for torque to increase 2 units above ML), t'50 (time for torque to reach ML+0.5[MH−ML]), and t'90 (time for torque to reach ML+0.9[MH−ML]).

Press-cured samples (150×150×2.0 mm sheets, unless otherwise noted) were prepared for physical property determination by pressing at about 6.9×10$^3$ kPa for 10 minutes at 177° C.

Tensile Strength at Break and Elongation at Break were determined using ASTM D 412-98 on samples cut from 2.0 mm sheet with ASTM Die D.

Glass transition temperature ($T_g$) was determined in accordance with ASTM D 793-01 and ASTM E 1356-98 by a Perkin-Elmer differential scanning calorimetry DSC 7.0 under a nitrogen flow and a heating rate of 20° C./min. The glass transition points ($T_g$) were obtained from the midpoint temperature of the peak obtained from −40° C. to 200° C. at a temperature rate of 20° C./min.

Retraction at Lower Temperatures was determined using ASTM D 1329-02 with ethanol as the cooling media. TR10 is the temperature to 10% retraction. Units are reported in ° C.

Solvent Volume swell was determined in accordance with the ASTM D 471-98 Method using Fuel H (CE15; 15% ethanol, 42.5% iso-octane; 42.5% toluene by volume) at 70° C. for 22 hours.

Monomer composition was determined by $^{19}F/^{1}H$ cross integration technique by dissolving raw gums in acetone-d6 solvent. $CFCl_3$, 1,4-(trifluoromethyl)-benzene, and small amounts of $CD_3CO_2D$ (deuterated acetic acid) were added to the solution. The solutions were transferred to NMR tubes for single trial analyses. 400 MHz $^{1}H$-NMR spectra and 376 MHz $^{19}F$-NMR spectra were acquired using a Varian UNI-TYplus 400 FT-NMR spectrometer.

Example 1

In Example 1, peroxide curable Compound A in Table 1 was prepared using a two roll mill by compounding a fluoroelastomer (TFE/HFP/VDF copolymer, available as Tecnoflon® P757 from Solvay Solexis, Inc., Thorofare, N.J.) with 30 parts of a silica (5 μm particle size $SiO_2$, available as Min-U-Sil® from U.S. Silica Co., Berkeley Springs, W. Va.), 1 part of hydrotalcite (available as Hysafe® 510 from Akrochem Corp., Akron, Ohio), 4 parts of triallylisocyanurate (TAIC) coagent (72% DLC, available as TAIC DLC®-A from Natrochem, Inc., Savannah, Ga.), 4 parts of 50% active 2,5-dimethyl-2,5-di(t-butylperoxy)-hexane (available as Varox® DBPH-50 from R.T. Vanderbilt, Norwalk, Conn.) and 0.5 parts process aid Struktol® WS280 (available from Struktol Co., Stow, Ohio).

The cure rheology of the compound was investigated by testing uncured, compounded mixtures using the Alpha Technology Moving Die Rheometer (MDR) Model 2000 and the procedure described in ASTM D 5289-95. The compound formulation and test results are summarized in Table 1.

The compound was press-cured using a 15×15 cm, 2 mm thick mold at 177° C. for 10 minutes. The cured samples were tested for the temperature retraction (TR10) in accordance with ASTM D 1329 with ethanol as the cooling media. The test results are summarized in Table 2.

Examples 2 and 3

In Examples 2 and 3, corresponding to Compounds B and C respectively, the samples were prepared and tested as in Example 1 except Compound B was prepared with a clay hydrous magnesium silicate (available as Mistron CB 0018, from Luzenac America, Inc., Englewood, Co) and Compound C was prepared with a titanium oxide TiO2 (available as Unitane®V from American Cyanamid Company, Wayne, N.J.) instead of silica. The compound formulations and test results are summarized in Table 1 and Table 2.

Comparative Example C1

In Comparative Example C1, corresponding to Compound D, the sample was prepared and tested as in Example 1 except Compound D was prepared with a carbon black (available as Thermax MT™, ASTM N990 from Cancarb, Medicine Hat, Alberta, Canada) instead of silica. The test results are summarized in Table 2.

Comparative Example C2

In Comparative Example C2, corresponding to Compound E, the sample was prepared and tested as in Example 1 except that in peroxide curable Compound E, TFE/VDF/PMVE copolymer (available as Viton® GFLT 301 from DuPont Dow LLC, Wilmington, Del.) was used instead of Tecnoflon® P757. The composition ratio of the polymer determined by $^{19}F/^{1}H$-NMR was TFE/VDF/PMVE=19/59/22 mole % and Mooney viscosity was 32. The $T_g$ by DSC of this polymer was −24° C. The test results are summarized in Table 2.

Example 4

In Example 4, corresponding to Compound F, the sample was prepared and tested as in Example 1 except that in peroxide curable Compound F, terpolymer A (TFE/HFP/VDF) was used instead of Tecnoflon® P757. Carbon black N762 (available from Cabot Corp. Alpharetta, Ga.) was added and Struktol® WS280 was not used. The composition ratio of the terpolymer A determined by $^{19}F/^{1}H$ NMR was TFE/HFP/VDF=9.9/14.3/75.3 mole % and the polymer contained 0.5 mole % BTFB as the cure site monomer and 0.1 mole % iodine. The calculated fluorine content was 65.7 wt %. Mooney viscosity of the raw gum was 35. The Tg of this polymer was −24° C. The test results are summarized in Table 2.

Example 5

In Example 5, corresponding to Compound G, the sample was prepared and tested as in Example 4 except that in peroxide curable Compound G, a mineral filler Wollastocoat® 10222 (surface coated or treated CaSiO3 with an acryloylsilane, available from Nyco Mineral, Inc., Willsboro, N.Y.) was used instead of silica. The test results are summarized in Table 2.

Comparative Example C3

In Comparative Example C3, corresponding to compound H, the sample was prepared and tested as in Example 4 except peroxide curable Compound H (no N762 carbon black and no silica) was used instead of Compound F. The test results are summarized in Table 2.

Example 6

In Example 6, corresponding to Compound J, the sample was prepared and tested as in Example 4 except that in peroxide curable Compound J, a blend of terpolymer A and terpolymer B was used instead of 100% terpolymer A. The test results are summarized in Table 2. The blend ratio was 80/20 wt %. Also, Compound J comprised 20 ppw silica, 15 ppw Wollastocoat® 10222, and I ppw Struktol® WS280 as compared to 30 ppw silica, 0 ppw Wollastocoat® 10222, and 0 ppw Struktol® WS280 in Example 4. The composition ratio of the terpolymer B determined by $^{19}F/^{1}H$ NMR was TFE/HFP/VDF=30.1/20.7/48.7 mole % and the polymer contained 0.38 mole % BTFB as the cure site monomer and 0.09 mole % iodine. The calculated fluorine content was 70.0 wt %. Mooney viscosity of the raw gum was 41. The $T_g$ of the terpolymer B was −7° C. The volume swell of the cured sample in Fuel H (CE15) for 22 hours at 70° C. was 34.6%.

Example 7

In Example 7, corresponding to Compound K, the sample was prepared and tested as in Example 6 except peroxide curable Compound K was used instead of Compound J. The test results are summarized in Table 2. The volume swell of the cured sample in Fuel H (CE15) for 22 hours at 70° C. was 33.5%.

TABLE 1

|  | A | B | C | D | E | F | G | H | J | K |
|---|---|---|---|---|---|---|---|---|---|---|
| Tecnoflon ® P757 | 100 | 100 | 100 | 100 |  |  |  |  |  |  |
| Viton ® GFLT |  |  |  |  | 100 |  |  |  |  |  |
| TFE/HFP/VDF terpolymer A |  |  |  |  |  | 100 | 100 | 100 | 80 | 80 |
| TFE/HFP/VDF terpolymer B |  |  |  |  |  |  |  |  | 20 | 20 |
| Min-U-Sil ® (SiO2) | 30 |  |  |  | 30 | 30 |  |  | 20 | 30 |
| Mistron ® CB 0018 (Clay) |  | 30 |  |  |  |  |  |  |  |  |
| Unitane ® (TiO2) |  |  | 30 |  |  |  |  |  |  |  |
| N990 (carbon black) |  |  |  | 30 |  |  |  |  |  |  |
| Wollastocoat ® 10222 (CaSiO3) |  |  |  |  |  |  | 30 |  | 15 | 5 |
| N762 (carbon black) |  |  |  |  |  | 1 | 1 |  | 1 | 1 |
| Hysafe ® 510 | 1 | 1 | 1 | 1 | 1 | 1 | 1 | 1 | 1 | 1 |
| Elastomag ® 170 (MgO) |  |  |  |  |  |  |  | 5 |  |  |
| TAIC 72% | 4 | 4 | 4 | 4 | 4 | 4 | 4 | 4 | 4 | 4 |
| Varox ® DBPH-50 | 4 | 4 | 4 | 4 | 4 | 4 | 4 | 4 | 4 | 4 |
| Struktol ® WS280 | 1 | 1 | 1 | 1 | 1 |  |  |  | 1 | 1 |
| Cure rheology |  |  |  |  |  |  |  |  |  |  |
| MDR at 177° C. 12 Minutes |  |  |  |  |  |  |  |  |  |  |
| ML (dN-m) | 2.3 | 1.5 | 1.23 | 1.7 | 1.0 | 0.7 | 0.7 | 0.6 | 0.8 | 1.2 |
| MH (dN-m) | 24.1 | 23.4 | 18.2 | 23.7 | 17.5 | 15.9 | 15.1 | 9.7 | 17.2 | 20.5 |
| MH-ML (dN-m) | 21.9 | 21.9 | 16.9 | 22.0 | 16.5 | 15.2 | 14.5 | 9.1 | 16.4 | 19.3 |
| TS 2, min | 0.2 | 0.42 | 0.45 | 0.2 | 0.4 | 0.5 | 0.5 | 0.6 | 0.5 | 0.4 |
| t'50, min | 0.3 | 0.55 | 0.58 | 0.3 | 0.7 | 0.6 | 0.6 | 0.7 | 0.6 | 0.6 |
| t'90, min | 0.4 | 0.71 | 0.73 | 0.4 | 2.4 | 1.2 | 1.1 | 1.2 | 1.1 | 1.2 |

TABLE 2

|  | PMVE containing polymer | Compound number | Tensile strength (MPa) | Elongation (%) | Filler Chemical name (Name) | Filler (phr) | Temperature retraction test (° C.) TR10 | Temperature retraction test (° C.) TR70 |
|---|---|---|---|---|---|---|---|---|
| Example 1 | No | A | 15.4 | 310 | SiO$_2$ (Min-U-Sil ®) | 30 | −23.2 | −15.8 |
| Example 2 | No | B | 16.4 | 413 | Clay (Mistron ® CB 18) | 30 | −20 | −9 |
| Example 3 | No | C | 9.2 | 379 | TiO2 (Unitane ®) | 30 | −21 | −15 |
| Co. Ex C1 | No | D | 15.6 | 294 | Carbon black (N990) | 30 | −17.8 | −8.8 |
| Co. Ex C2 | Yes | E | 13.7 | 213 | SiO$_2$ (Min-U-Sil ®) | 30 | −23.1 | −15 |
| Example 4 | No | F | 11.1 | 344 | SiO$_2$ (Min-U-Sil ®) Carbon black (N762) | 30 1 | −24 | 21 |
| Example 5 | No | G | 9.6 | 317 | CaSiO$_3$ (Wollastocoat ®) Carbon black (N762) | 30 1 | −26 | 19 |
| Co. Ex. C3 | No | H | 2.3 | 175 | No filler | 0 | −26 | 12 |
| Example 6 | No | J | 11.4 | 335 | SiO$_2$ (Min-U-Sil ®) CaSiO$_3$ (Wollastocoat ®) Carbon black (N762) | 20 15 1 | −21 | 16 |
| Example 7 | No | K | 12.2 | 305 | SiO$_2$ (Min-U-Sil ®) CaSiO$_3$ (Wollastocoat ®) Carbon black (N762) | 20 15 1 | −21 | 13 |

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A compound comprising:
    (a) an elastomeric copolymer having interpolymerized monomeric units derived from vinylidene fluoride monomer, at least one cure site moiety, and substantially no perfluorinated vinyl ether monomers;
    (b) a peroxide curable component;
    (c) at least one mineral filler, such that upon vulcanization the resulting compound has a retraction at lower temperature (TR-10) of −20° C. or less; and
    (d) a peroxide.

2. The compound according to claim 1, wherein said copolymer includes terpolymers or quadpolymers.

3. The compound according to claim 1, wherein said copolymer further comprises, tetrafluoroethylene, hexafluoropropylene, chlorotrifluoroethylene, pentafluoropropylene, vinyl fluoride, propylene, ethylene or combinations thereof.

4. The compound according to claim 1, wherein said compound includes a blend of at least two copolymers.

5. The compound according to claim 4, wherein at least two of said copolymers have a difference in fluorine content of at least 3 weight %.

6. The compound according to claim 1, wherein said copolymer further comprises ethylenically unsaturated monomers of the formula $CF_2=CFR_f$ where $R_f$ is fluorine or perfluoroalkyl of 1 to 8 carbon atoms.

7. The compound according to claim 1, wherein said at least one cure site moiety is derived from one or more compounds of the formula: (a) $CX_2=CX(Z)$, wherein: (i) X each is independently H or F; and (ii) Z is Br, I, Cl or $R_f2$-U wherein U=Br, I, Cl, or CN and $R_f2$=a perfluorinated divalent linking group optionally containing O atoms; or (b) $Y(CF_2)_qY$, wherein: (i) Y is Br or I or Cl and (ii) q=1–6.

8. The compound according to claim 7, wherein said at least cure site moiety are derived from $CF_2=CFBr$, $CF_2=CHBr$, $ICF_2CF_2CF_2CF_2I$, $CH_2I_2$, $BrCF_2CF_2Br$, $CF_2=CFO(CF_2)_3-OCF_2CF_2Br$, $CF_2=CFOCF_2CF_2Br$, $CH_2=CHCF_2CF_2Br$, $CH_2=CHCF_2CF_2I$, $CF_2=CFCl$ or mixtures thereof.

9. The compound according to claim 7, wherein said compound having the formula $CX_2=CX(Z)$ has an iodine or a bromine or a chlorine chemically bonded to chain ends.

10. The compound according to claim 1, wherein said component (a) is formed by emulsion polymerization.

11. The compound according to claim 1, wherein said at least one mineral filler includes clay, silica, talc, diatomaceous earth, barium sulfate, wollastonite, calcium carbonate, calcium fluoride, titanium oxide, iron oxide, or combinations thereof.

12. The compound according to claim 11, wherein the at least one mineral filler is surface treated.

13. The compound of claim 1, further comprising acid acceptors.

14. The compound according to claim 1, wherein said compound has a solvent volume swell in FUEL H (CE15) of about 60% or less, according to ASTM D471-98 or a tensile strength of about 3.5 MPa or greater according to ASTM D418-02.

15. A compound consisting essentially of:
   (a) an elastomeric copolymer having two or more interpolymerized monomeric units derived from vinylidene fluoride monomer, tetrafluoroethylene, hexafluoropropylene, chlorotrifluoroethylene, pentafluoropropylene, vinyl fluoride, propylene, or ethylene;
   (b) at least one cure site moiety;
   (c) a peroxide curable component comprising at least one mineral filler, such that upon vulcanization the resulting compound has a retraction at lower temperature (TR-10) of $-20°$ C. or less; and
   (d) a peroxide.

16. A method of forming an elastomer, comprising vulcanizing the compound of claim 1.

17. An article comprising a cured compound according to claim 1.

18. A method of forming a compound comprising, polymerizing an elastomeric copolymer having interpolymerized monomeric units derived from vinylidene fluoride monomer, at least one cure site moiety, and substantially no perfluorinated vinyl ether monomers, a curable component, and at least one mineral filler.

* * * * *

UNITED STATES PATENT AND TRADEMARK OFFICE
CERTIFICATE OF CORRECTION

PATENT NO. : 7,138,470 B2  
APPLICATION NO. : 10/759497  
DATED : November 21, 2006  
INVENTOR(S) : Tatsuo Fukushi Page 1 of 1

It is certified that error appears in the above-identified patent and that said Letters Patent is hereby corrected as shown below:

Column 11
Line 18, Claim 8, insert -- one -- following "least".

Column 12
Line 31, Claim 18, insert -- peroxide -- following "a".
Line 31, Claim 18, insert -- a peroxide -- following "component".

Signed and Sealed this

Twentieth Day of March, 2007

JON W. DUDAS
*Director of the United States Patent and Trademark Office*